(12) United States Patent
Zhu et al.

(10) Patent No.: US 11,402,827 B2
(45) Date of Patent: Aug. 2, 2022

(54) METHOD FOR CONTROLLING A MANUFACTURING PROCESS PARAMETER AND ELECTRONIC DEVICE

(71) Applicants: HEFEI XINSHENG OPTOELECTRONICS TECHNOLOGY CO., LTD., Anhui (CN); BOE Technology Group Co., Ltd., Beijing (CN)

(72) Inventors: Yong Zhu, Beijing (CN); Shoubing Sun, Beijing (CN); Shangyi Xu, Beijing (CN); Yang Zhang, Beijing (CN)

(73) Assignees: HEFEI XINSHENG OPTOELECTRONICS TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 199 days.

(21) Appl. No.: 16/640,585

(22) PCT Filed: Apr. 17, 2019

(86) PCT No.: PCT/CN2019/083036
§ 371 (c)(1),
(2) Date: Feb. 20, 2020

(87) PCT Pub. No.: WO2019/218833
PCT Pub. Date: Nov. 21, 2019

(65) Prior Publication Data
US 2020/0356084 A1    Nov. 12, 2020

(30) Foreign Application Priority Data
May 16, 2018  (CN) .......................... 201810466970.9

(51) Int. Cl.
G05B 19/418        (2006.01)
G05B 23/02         (2006.01)

(52) U.S. Cl.
CPC ... G05B 19/41875 (2013.01); G05B 19/4183 (2013.01); G05B 19/4184 (2013.01);
(Continued)

(58) Field of Classification Search
CPC .......... G05B 19/41875; G05B 19/4183; G05B 19/4184; G05B 19/41865; G05B 23/0216;
(Continued)

(56) References Cited

U.S. PATENT DOCUMENTS 5,191,313 A    3/1993  Galbraith
2006/0282189 A1*  12/2006  Akisawa .......... G05B 19/41865
                                                700/110
(Continued)

FOREIGN PATENT DOCUMENTS

CN    1393808 A     1/2003
CN    101694580 A   4/2010
(Continued)

OTHER PUBLICATIONS

Second Office Action, including Search Report, for Chinese Patent Application No. 201810466970.9, dated Sep. 27, 2020, 23 pages.
(Continued)

Primary Examiner — Hien D Khuu
(74) Attorney, Agent, or Firm — Westman, Champlin & Koehler, P.A.

(57) ABSTRACT

The present disclosure provides a method for controlling a manufacturing process parameter, a manufacturing execution server, and an equipment interface server. The method includes: acquiring manufacturing process parameter information of an manufacturing equipment; and verifying the acquired manufacturing process parameter information
(Continued)

according to reference ranges of manufacturing process parameter information of multiple manufacturing equipments which are registered in advance, and feeding back a verification result.

12 Claims, 11 Drawing Sheets

(52) U.S. Cl.
CPC ..... *G05B 19/41865* (2013.01); *G05B 23/027* (2013.01); *G05B 23/0216* (2013.01); *G05B 23/0272* (2013.01)

(58) Field of Classification Search
CPC .............. G05B 23/027; G05B 23/0272; G05B 2219/32252
USPC ............................................................ 700/9
See application file for complete search history.

(56) References Cited

U.S. PATENT DOCUMENTS

| 2010/0114810 | A1* | 5/2010 | Hoyte | G05B 19/0426 706/47 |
| 2017/0078238 | A1* | 3/2017 | Huang | G06Q 50/04 |

FOREIGN PATENT DOCUMENTS

| CN | 201796275 | U | | 4/2011 |
| CN | 102436238 | A | | 5/2012 |
| CN | 102737485 | A | | 10/2012 |
| CN | 102922089 | A | | 2/2013 |
| CN | 105223914 | A | | 1/2016 |
| CN | 105515909 | A | | 4/2016 |
| CN | 105589410 | A | | 5/2016 |
| CN | 105865534 | A | | 8/2016 |
| CN | 106094745 | A | | 11/2016 |
| CN | 106527377 | A | | 3/2017 |
| CN | 107784706 | A | | 3/2018 |
| CN | 108693846 | A | | 10/2018 |
| JP | WO 2018097171 | | * | 5/2018 |
| JP | 2018129030 | | * | 8/2018 |
| TW | M334411 | | * | 6/2008 |

OTHER PUBLICATIONS

First Office Action, including Search Report, for Chinese Patent Application No. 201810466970.9, dated Mar. 27, 2020, 21 pages.

* cited by examiner

METHOD FOR CONTROLLING A MANUFACTURING PROCESS PARAMETER AND ELECTRONIC DEVICE

CROSS-REFERENCE TO RELATED APPLICATION(S)

This application is a Section 371 National Stage application of International Application No. PCT/CN2019/083036, filed on Apr. 17, 2019, which published as WO 2019/218833 A1, on Nov. 21, 2019, and claims priority to Chinese Patent Application No. CN201810466970.9, filed on May 16, 2018, the contents of which are incorporated herein by reference in their entireties.

TECHNICAL FIELD

The present disclosure relates to the technical field of management of a manufacturing process, and more particularly, the present disclosure relates to a method for controlling a manufacturing process parameter, a manufacturing execution server, and an equipment interface server.

BACKGROUND

In a process of manufacturing a product, stability of a manufacturing equipment directly affects quality of the product. If a manufacturing process parameter of the manufacturing equipment fluctuates and thus deviates from a reference range, it is easy to produce fault products. Therefore, one of important measures for ensuring the quality of the product is to quickly and accurately inspect the manufacturing process parameter of the manufacturing equipment and timely correct a wrong value of the parameter.

Currently, a method for managing a manufacturing process parameter of a manufacturing equipment is still a manual inspection method, that is, an operator periodically visits a manufacturing site to inspect and record the manufacturing process parameter of the equipment. However, a manufacturing line is often equipped with multiple equipments, and each of the devices has multiple types of manufacturing process parameters which need to be inspected. Therefore, this is a work with a large amount of data, and manual inspection is time-consuming and labor-intensive, which results in poor timeliness.

At the same time, when the operator inspects the manufacturing process parameters, the operator needs to determine whether the manufacturing process parameters are within a reference range. Due to the many types of manufacturing process parameters and the large amount of data, the manual inspection method has a high error rate, and if a result of the determination is wrong, it may cause negative influences. For example, if a wrong manufacturing process parameter is determined to be correct, it is easy to produce fault products; and if a correct manufacturing process parameter is determined to be wrong, shutdown may be required for inspection, which affects manufacturing efficiency and a rate of progress. Moreover, even if the operator finds that the manufacturing process parameters are wrong, early warning measures may not be implemented in time, and the accident is handled at a low response speed.

In addition, if the manual inspection method is adopted, data of the manufacturing process parameters recorded by the operator is lack of systematic management. Once a quality problem of the product occurs and the data needs to be inspected to find the cause, traceability of the data is poor, which is not conducive to analysis of the data, and therefore may affect the work of finding accident problems, and then affect the ability to subsequently predict and prevent process accidents.

In summary, the following problems need to be solved: the method for managing a manufacturing process parameter of a manufacturing equipment has poor timeliness and a high error rate, an accident is handled at a low response speed, and data is lack of systematic management etc.

SUMMARY

According to a first aspect of the embodiments of the present disclosure, there is provided a method for controlling a manufacturing process parameter, comprising:
acquiring manufacturing process parameter information of a manufacturing equipment; and
verifying the acquired manufacturing process parameter information according to reference ranges of manufacturing process parameter information of multiple manufacturing equipments which are registered in advance, and feeding back a verification result.

In an embodiment, acquiring manufacturing process parameter information of an manufacturing equipment comprises at least one of:
receiving changed manufacturing process parameter information of the manufacturing equipment which is uploaded by an equipment interface server; or
when a manufacturing process parameter collection request transmitted by a terminal device is received, issuing a corresponding manufacturing process parameter collection instruction to receive manufacturing process parameter information of the manufacturing equipment which is uploaded by the equipment interface server for the instruction; or
receiving manufacturing process parameter information of the manufacturing equipment which is uploaded by the equipment interface server for a manufacturing process parameter collection instruction which is issued periodically; or
receiving changed manufacturing process parameter information of the manufacturing equipment which is transmitted by the terminal device.

In an embodiment, the manufacturing process parameter information comprises an identification of the manufacturing equipment, a product type of a processed product, and a type and a value of the manufacturing process parameter when the product is processed; and
the manufacturing process parameter information further comprises a processing time during which the product is processed by the manufacturing equipment.

In an embodiment, verifying the acquired manufacturing process parameter information according to reference ranges of manufacturing process parameter information of multiple manufacturing equipments which are registered in advance comprises:
determining a reference range of the manufacturing process parameter corresponding to the identification of the manufacturing equipment, the type of the manufacturing process parameter and the product type in the acquired manufacturing process parameter information according to a preset correspondence relationship between identifications of multiple manufacturing equipments, types of manufacturing process parameters and product types and reference ranges of the manufacturing process parameters; and
verifying whether the value of the manufacturing process parameter in the acquired manufacturing process parameter information exceeds the reference range, and when a verification result is no, confirming that the verification is passed; and when the verification result is yes, confirming that the verification is failed.

In an embodiment, feeding back a verification result comprises:

when it is confirmed that the verification is failed, transmitting a parameter alarm reminder to the terminal device, and issuing equipment alarm information or equipment freezing information for the manufacturing equipment to the equipment interface server according to alarm mode information in the reference range, so that the manufacturing equipment gives an alarm or stops operations; and when it is confirmed that the verification is passed, transmitting the acquired manufacturing process parameter information to the terminal device, so that the terminal device displays the acquired manufacturing process parameter information.

In an embodiment, the method further comprises: storing the identification of the manufacturing equipment, the product type and the processing time of the processed product, and the type and the value of the manufacturing process parameter when the product is processed in the acquired manufacturing process parameter information; and when a query instruction for the manufacturing process parameter information is received, feeding back the stored identification of the manufacturing equipment, the stored product type and processing time of the processed product, and the stored type and value of the manufacturing process parameter when the product is processed for analysis.

According to a second aspect of the embodiments of the present disclosure, there is provided a method for controlling a manufacturing process parameter, comprising:

receiving changed manufacturing process parameter information of a manufacturing equipment which conforms to a first protocol and a first format, or when a manufacturing process parameter collection instruction issued by a manufacturing execution server is received, acquiring manufacturing process parameter information of the manufacturing equipment which conforms to the first protocol and the first format; and after the manufacturing process parameter information which conforms to the first protocol and the first format is converted into manufacturing process parameter information which conforms to a second protocol and a second format, uploading the manufacturing process parameter information which conforms to the second protocol and the second format to the manufacturing execution server, so that the manufacturing execution server verifies the acquired manufacturing process parameter information according to reference ranges of manufacturing process parameter information of multiple manufacturing equipments which are registered in advance, and feeding back a verification result.

In an embodiment, the method further comprises:

when equipment alarm information or equipment freezing information for the manufacturing equipment issued by the manufacturing execution server is received, converting the equipment alarm information or equipment freezing information into equipment alarm information or equipment freezing information which conforms to the first protocol and the first format, and issuing the equipment alarm information or equipment freezing information which conforms to the first protocol and the first format to the manufacturing equipment, so that the manufacturing equipment gives an alarm or stops operations.

According to a third aspect of the embodiments of the present disclosure, there is provided an electronic device for controlling a manufacturing process parameter, comprising:

a processor; and a memory connected to the processor, and having stored thereon executable instructions which, when executed by the processor, cause the processor to be configured to:

acquire manufacturing process parameter information of an manufacturing equipment; and verify the acquired manufacturing process parameter information according to reference ranges of manufacturing process parameter information of multiple manufacturing equipments which are registered in advance, and feed back a verification result.

In an embodiment, the processor is further configured to perform at least one of:

receiving changed manufacturing process parameter information of the manufacturing equipment which is uploaded by an equipment interface server; or when a manufacturing process parameter collection request transmitted by a terminal device is received, issuing a corresponding manufacturing process parameter collection instruction to receive manufacturing process parameter information of the manufacturing equipment which is uploaded by the equipment interface server for the instruction; or receiving manufacturing process parameter information of the manufacturing equipment which is uploaded by the equipment interface server for a manufacturing process parameter collection instruction which is issued periodically; or receiving changed manufacturing process parameter information of the manufacturing equipment which is transmitted by the terminal device.

In an embodiment, the manufacturing process parameter information comprises an identification of the manufacturing equipment, a product type of a processed product, and a type and a value of the manufacturing process parameter when the product is processed; and the manufacturing process parameter information further comprises a processing time during which the product is processed by the manufacturing equipment.

In an embodiment, the processor is further configured to:

determine a reference range of the manufacturing process parameter corresponding to the identification of the manufacturing equipment, the type of the manufacturing process parameter and the product type in the acquired manufacturing process parameter information according to a preset correspondence relationship between identifications of multiple manufacturing equipments, types of manufacturing process parameters and product types and reference ranges of the manufacturing process parameters; and verify whether the value of the manufacturing process parameter in the acquired manufacturing process parameter information exceeds the reference range, and when a verification result is no, confirm that the verification is passed; and when the verification result is yes, confirm that the verification is failed.

In an embodiment, the processor is further configured to:

when it is confirmed that the verification is failed, transmit a parameter alarm reminder to the terminal device, and issue equipment alarm information or equipment freezing information for the manufacturing equipment to the equipment interface server according to alarm mode information in the reference range, so that the manufacturing equipment gives an alarm or stops operations; and when it is confirmed that the verification is passed, transmit the acquired manufacturing process parameter information to the terminal device, so that the terminal device displays the acquired manufacturing process parameter information.

In an embodiment, the manufacturing execution server further comprises:

a storage configured to store the identification of the manufacturing equipment, the product type and the processing time of the processed product, and the type and the value of the manufacturing process parameter when the product is processed in the acquired manufacturing process parameter information, wherein the processor is further configured to, when a query instruction for the manufacturing process parameter information is received, feed back the stored identification of the manufacturing equipment, the stored product type and processing time of the processed product, and the stored type and value of the manufacturing process parameter when the product is processed for analysis.

According to a fifth aspect of the embodiments of the present disclosure, there is provided a nonvolatile computer-readable storage medium having stored thereon a computer program which, when executed by a processor, implements the method for controlling a manufacturing process parameter.

Additional aspects and advantages of the present disclosure will be given in part in the following description, and will become apparent from the following description or be learned through the practice of the present disclosure.

BRIEF DESCRIPTION OF THE ACCOMPANYING DRAWINGS

The above and/or additional aspects and advantages of the present disclosure will become apparent and easily understood from the following description of the embodiments in conjunction with the accompanying drawings, in which.

DETAILED DESCRIPTION

Figure 1:
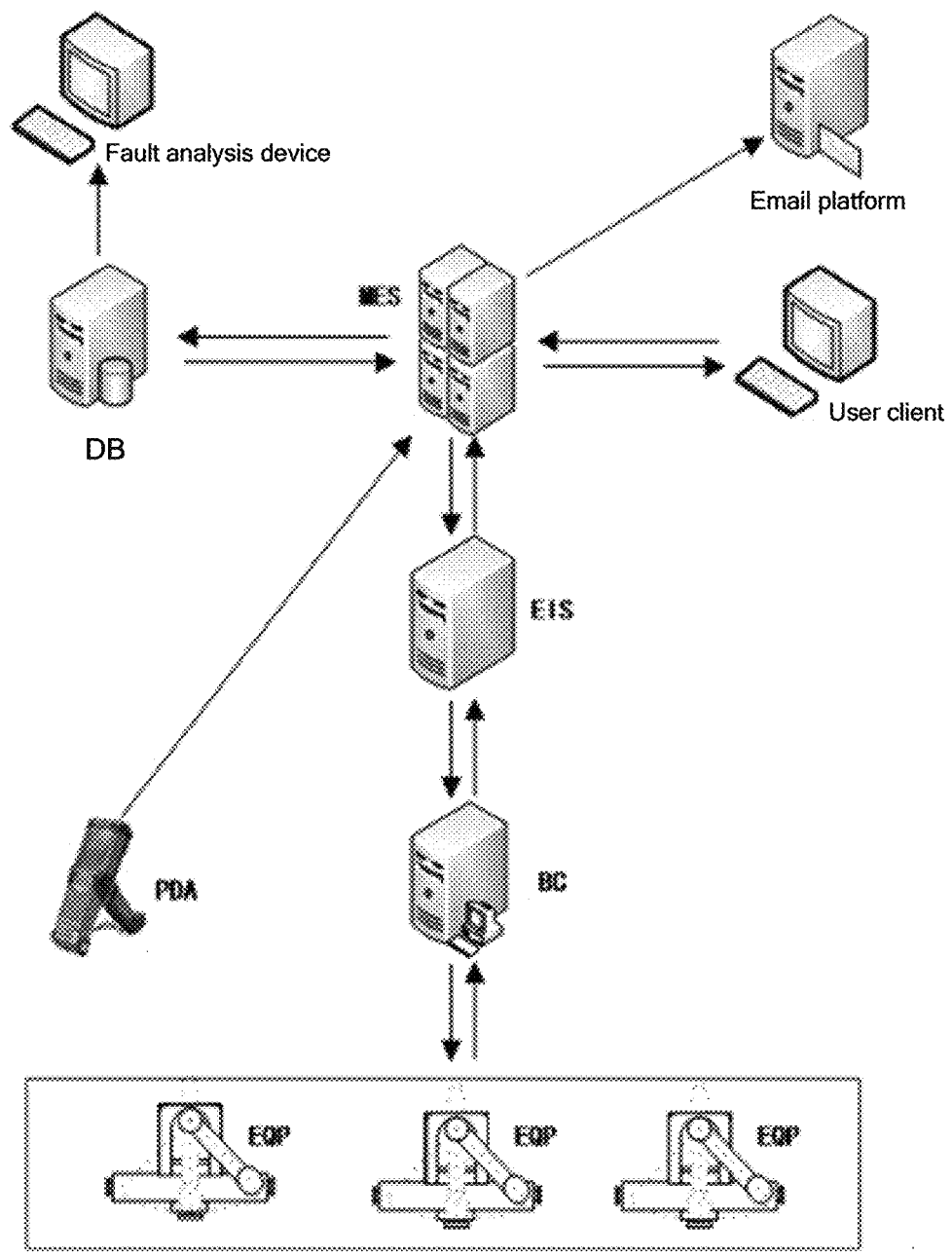
FIG. 1 is an architecture diagram of a server for controlling a manufacturing process parameter according to an embodiment of the present disclosure.

The embodiments of the present disclosure will be described in detail below, and examples of the embodiments are illustrated in the accompanying drawings, in which the same or similar reference signs are used to refer to the same or similar elements or elements having the same or similar functions. The embodiments described below with reference to the accompanying drawings are intended to be illustrative only, and are merely used to explain the present disclosure, but should not be construed as limiting the present disclosure.

It may be understood by those skilled in the art that singular forms "a", "an", "the" used here may also comprise plural forms, unless otherwise stated. It should also be understood that phrase "comprise" used in the specification of the present disclosure refers to presence of the features, integers, steps, operations, elements and/or components, but should not preclude the presence or addition of one or more other features, integers, steps, operations, elements, components, and/or groups thereof. It should be understood that when an element is referred to as being "connected" or "coupled" to another element, it may be directly connected or coupled to the other element, or there may be an intermediate element therebetween. Further, "connected" or "coupled" as used here may comprise either a wireless connection or a wireless coupling. The phrase "and/or" used here comprises all or any of one or more of associated listed items, or all combinations thereof.

It may be understood by those skilled in the art that all terms (comprising technical and scientific terms) used here have the same meaning as commonly understood by those of ordinary skill in the art to which the present disclosure belongs, unless otherwise defined. It should also be understood that terms such as those defined in a general dictionary should be understood to have meaning consistent with the meaning in the context of the related art, and will not be explained as an idealized or excessively formal meaning unless specifically defined as here.

It may be understood by those skilled in the art that the "terminal" and "terminal device" used here comprise not only a wireless signal receiver device, which has only a wireless signal receiver without a transmitting capability, but also comprise a receiving and transmitting hardware device which is capable of two-way communication over a two-way communication link. Such a device may comprise:

a cellular or other communication device which may comprise a single line display or a multi-line display or may not comprise a multi-line display; a Personal Communication Service (PCS), which may comprise voice, data processing, fax, and/or data communication capabilities; a Personal Digital Assistant (PDA), which may comprise a radio frequency receiver, a pager, Internet/Intranet access, a web browser, a notepad, a calendar, and/or a Global Positioning System (GPS) receiver; and a conventional laptop and/or palmtop computer or other device having and/or comprising a radio frequency receiver. The "terminal" and "terminal device" used here may be portable, transportable, installed in transportations (aviation transportations, sea transportations and/or land transportations), or adapted and/or configured to operate locally, and/or operate in any other location on the earth and/or space in a distributed form. The "terminal" and "terminal device" used here may also be communication terminals, internet terminals, or music/video playing terminals, for example, PDAs, Mobile Internet Devices (MIDs), and/or mobile phones having music/video playback functions, or may also be devices such as smart TVs, set-top boxes etc. It may be understood by those skilled in the art that the present disclosure comprises devices related to performing one or more of operations described in the present disclosure. These devices may be specially designed and manufactured for a required purpose, or may comprise known devices in general-purpose computers. These devices have stored therein computer programs which are selectively activated or reconstructed. Such computer programs may be stored in a device (for example, a computer) readable medium or in any type of medium suitable for storing electronic instructions and coupled to a bus respectively, comprising but not limited to any type of disk (including a floppy disk, a hard disk, an optical disk, a CD-ROM, and a magneto-optical disk), a Read-Only Memory (ROM), a Random Access Memory (RAM), an Erasable Programmable Read-Only Memory (EPROM), an Electrically Erasable Programmable Read-Only Memory (EEPROM), a flash memory, a magnetic card or an optical card. That is, the readable medium comprises any medium which stores or transfers information in a readable form by a device (for example, a computer).

It may be understood by those skilled in the art that computer program instructions may be used to implement each block in these structural diagrams and/or block diagrams and/or flowcharts and a combination of the blocks in these structural diagrams and/or block diagrams and/or flowcharts. It may be understood by those skilled in the art that these computer program instructions may be provided to a general-purpose computer, a specific-purpose computer, or a processor for other programmable data processing methods to be executed, so that the computer or the processor for the other programmable data processing methods implements the solutions specified in one or more blocks in the structural diagrams and/or block diagrams and/or flowcharts disclosed in the present disclosure.

In the embodiment of the present disclosure, interaction of information between a system for controlling a manufacturing process parameter and a manufacturing equipment may be realized in real time, i.e., having high timeliness. The manufacturing process parameter information of the manufacturing equipment may be automatically collected and verified, and at the same time a verification result is fed back, the manufacturing process parameter is collected at a higher speed, the verification has higher accuracy, and the verification result may be fed back rapidly, to avoid a batch of quality accidents.

In the embodiment of the present disclosure, when it is confirmed that the verification of the manufacturing process parameter of the manufacturing equipment is failed, a manufacturing execution server may issue equipment alarm information for the manufacturing equipment to an equipment interface server to remind a user to adjust the manufacturing process parameter in time; or the manufacturing execution server may issue equipment freezing information for the manufacturing equipment to an equipment interface, so that the manufacturing equipment stops operations to make the manufacturing suspended, thereby avoiding continuous manufacturing of fault products, and ensuring the safety of the manufacturing equipment; and the manufacturing execution server may further transmit a parameter alarm reminder to a terminal device, so that even if the user is not in a manufacturing site, the user may obtain a verification result in time through the user client to immediately take corresponding measures.

A method for controlling a manufacturing process parameter according to an embodiment of the present disclosure is implemented by a system for controlling a manufacturing process parameter, through which a manufacturing process parameter of a manufacturing equipment (EQP) is controlled.

As shown in FIG. 1, the system for controlling a manufacturing process parameter comprises a terminal device, an Equipment Interface Server (EIS) and a Manufacturing Execution Server (MES). Here, the terminal device is responsible for human-computer interaction, and may transmit a manufacturing process parameter collection request or changed manufacturing process parameter information of the manufacturing equipment to the manufacturing execution server. The equipment interface server is used to detect change of manufacturing process parameter information of an manufacturing equipment, or receive the manufacturing process parameter collection instruction issued by a manufacturing execution server and acquire manufacturing process parameter information of the manufacturing equipment which conforms to a first protocol and a first format, and then after the manufacturing process parameter information which conforms to the first protocol and the first format is converted into manufacturing process parameter information which conforms to a second protocol and a second format, upload the manufacturing process parameter information which conforms to the second protocol and the second format to the manufacturing execution server. The manufacturing execution server is used to acquire the manufacturing process parameter information of the manufacturing equipment, verify the acquired manufacturing process parameter information according to reference ranges of manufacturing process parameter information of multiple manufacturing equipments which are registered in advance, and feed back a verification result.

As shown in FIG. 1, in the embodiment of the present disclosure, the system for controlling a manufacturing process parameter further comprises a Block Controller (BC), a Database (DB), a fault analysis device, and an email platform. Further, the terminal device is configured to comprise a user client and a Personal Digital Assistant (PDA). The equipment interface server further comprises an equipment-side sensor which is used to detect change of the manufacturing process parameter information of the manufacturing equipment. The database is specifically an Oracle database.

The equipment interface server, the user client, the fault analysis device, and the email platform are electrically connected to the manufacturing execution server, the equipment interface server, a BC, and the manufacturing equipment respectively. The above components may be connected in a wired manner or wirelessly.

The PDA is electrically connected to the manufacturing execution server. The PDA is wirelessly connected to the manufacturing execution server.

Figure 2:
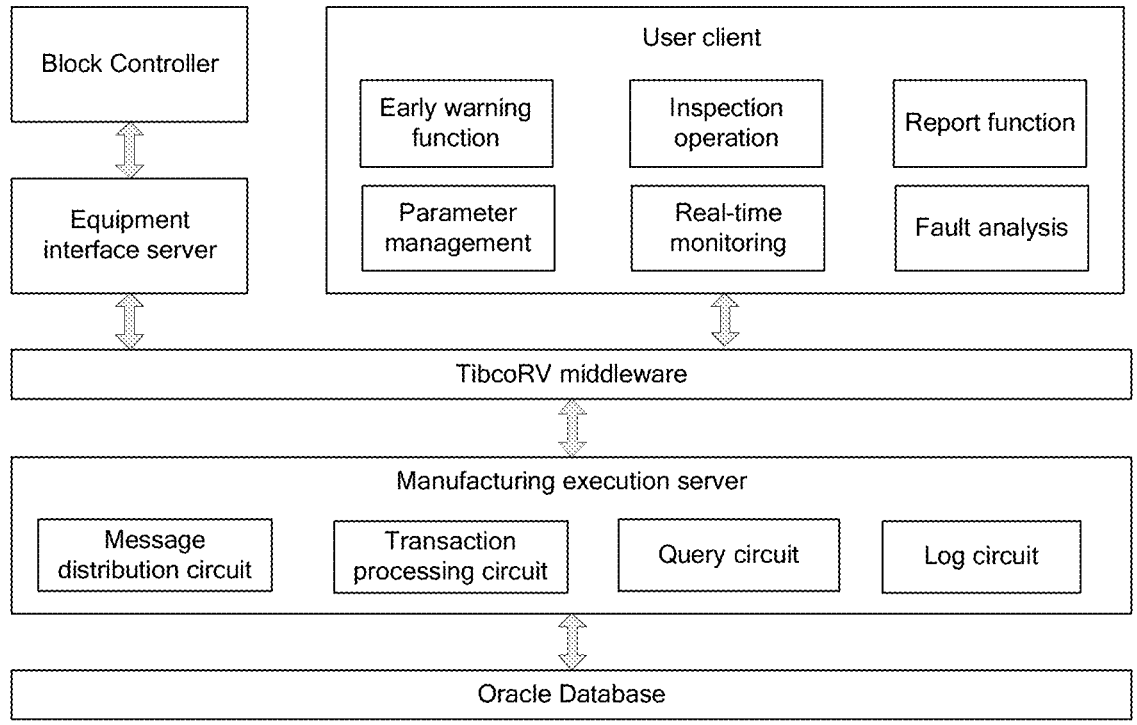
FIG. 2 is a schematic block diagram of a server for controlling a manufacturing process parameter according to an embodiment of the present disclosure.
Figure 3:
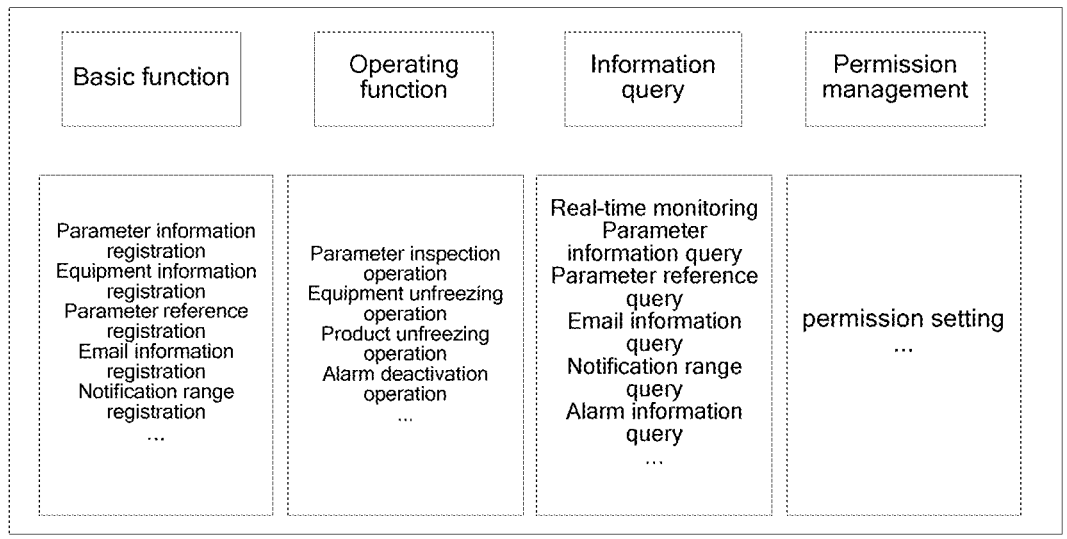
FIG. 3 is a functional diagram of a user client according to an embodiment of the present disclosure.

FIG. 2 is a schematic block diagram of a system for controlling a manufacturing process parameter according to an embodiment of the present disclosure, and FIG. 3 is a functional diagram of a user client according to an embodiment of the present disclosure. As shown in FIG. 2 and FIG. 3, in the embodiment of the present disclosure, the user client comprises a basic function circuit, an operating function circuit, an information query circuit, and a permission management circuit. The basic function circuit may implement parameter information registration, equipment information registration, parameter reference registration, email information registration, and notification range registration etc. The operating function circuit may implement parameter inspection operations, equipment unfreezing operations, product unfreezing operations, and alarm deactivation operations etc. The information query circuit may implement real-time monitoring, parameter information query, parameter reference query, email information query, notification range query and alarm information query etc. The permission management circuit is used to implement permission setting. The manufacturing execution server comprises a message distribution circuit, a transaction processing circuit, a query circuit, and a log circuit.

As shown in FIG. 2, in the embodiment of the present disclosure, the system for controlling a manufacturing process parameter further comprises a TIBCO Rendezvous (TibcoRV) middleware. Interaction between the manufacturing execution server and the equipment interface server and interaction between the manufacturing execution server and the user client are achieved through the TibcoRV middleware. At the same time, the equipment interface server interacts with the Block Controller (BC), and the manufacturing execution server interacts with the Oracle database.

Figure 4:
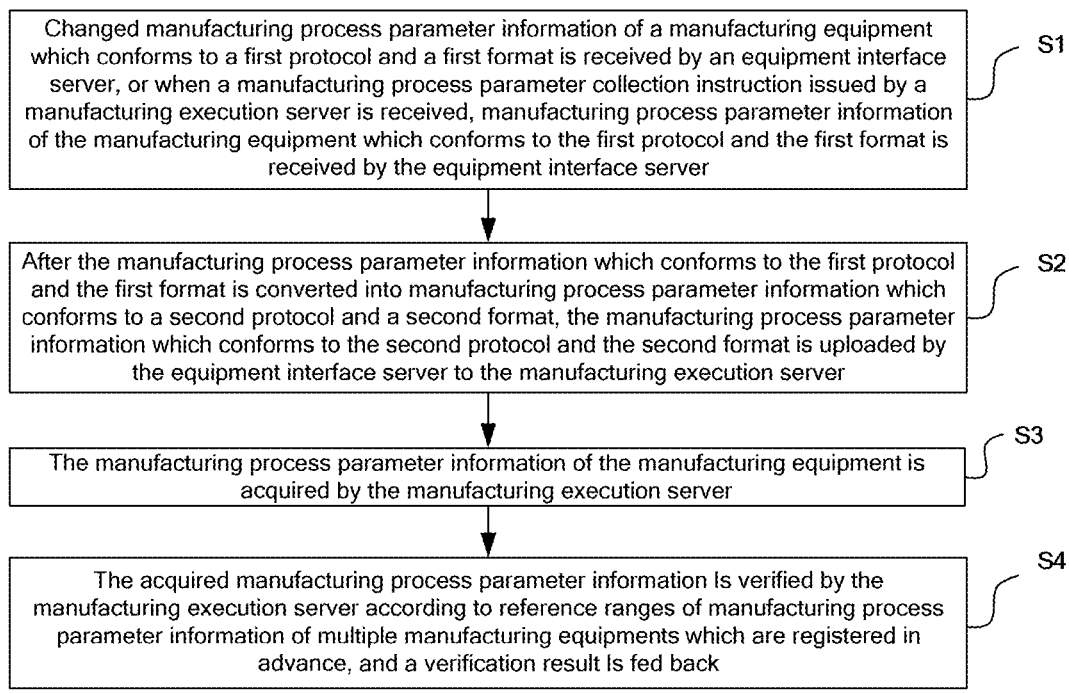
FIG. 4 is a schematic flowchart of a method for controlling a manufacturing process parameter according to an embodiment of the present disclosure.

The present disclosure provides a method for controlling a manufacturing process parameter. A schematic flowchart of the method is shown in FIG. 4, which comprises the following steps: S1: receiving, by an equipment interface server, changed manufacturing process parameter information of an manufacturing equipment which conforms to a first protocol and a first format, or when a manufacturing process parameter collection instruction issued by a manufacturing execution server is received, acquiring manufacturing process parameter information of the manufacturing equipment which conforms to the first protocol and the first format; S2: after the manufacturing process parameter information which conforms to the first protocol and the first format is converted into manufacturing process parameter information which conforms to a second protocol and a second format, uploading, by the equipment interface server, the manufacturing process parameter information which conforms to the second protocol and the second format to the manufacturing execution server; S3: acquiring, by the manufacturing execution server, the manufacturing process parameter information of the manufacturing equipment; and S4: verifying, by the manufacturing execution server, the acquired manufacturing process parameter information according to reference ranges of manufacturing process parameter information of multiple manufacturing equipments which are registered in advance, and feeding back a verification result.

In the method for controlling a manufacturing process parameter according to the present disclosure, interaction of information between a system for controlling a manufacturing process parameter and a manufacturing equipment may be realized in real time, i.e., having high timeliness. The manufacturing process parameter information of the manufacturing equipment may be automatically collected and verified, and at the same time a verification result is fed back, the manufacturing process parameter is collected at a higher speed, the verification has higher accuracy, and the verification result may be fed back rapidly, to avoid a batch of quality accidents.

Acquiring manufacturing process parameter information of an manufacturing equipment in S1 comprises at least one of:

receiving changed manufacturing process parameter information of the manufacturing equipment which is uploaded by an equipment interface server; or when a manufacturing process parameter collection request transmitted by a terminal device is received, issuing a corresponding manufacturing process parameter collection instruction to receive manufacturing process parameter information of the manufacturing equipment which is uploaded by the equipment interface server for the instruction; or receiving manufacturing process parameter information of the manufacturing equipment which is uploaded by the equipment interface server for a manufacturing process parameter collection instruction which is issued periodically; or receiving changed manufacturing process parameter information of the manufacturing equipment which is transmitted by the terminal device.

In an embodiment, the manufacturing process parameter information comprises an identification of the manufacturing equipment, a product type of a processed product, and a type and a value of the manufacturing process parameter when the product is processed; and the manufacturing process parameter information further comprises a processing time during which the product is processed by the manufacturing equipment.

Verifying the acquired manufacturing process parameter information according to reference ranges of manufacturing process parameter information of multiple manufacturing equipments which are registered in advance in S4 comprises:

determining a reference range of the manufacturing process parameter corresponding to the identification of the manufacturing equipment, the type of the manufacturing process parameter and the product type in the acquired manufacturing process parameter information according to a preset correspondence relationship between identifications of multiple manufacturing equipments, types of manufacturing process parameters and product types and reference ranges of the manufacturing process parameters; and verifying whether the value of the manufacturing process parameter in the acquired manufacturing process parameter information exceeds the reference range, and when a verification result is no, confirming that the verification is passed; and when the verification result is yes, confirming that the verification is failed.

Feeding back a verification result in S4 comprises: when it is confirmed that the verification is failed, transmitting a parameter alarm reminder to the terminal device, and issuing equipment alarm information or equipment freezing information for the manufacturing equipment to the equipment interface server according to alarm mode information in the reference range, so that the manufacturing equipment gives an alarm or stops operations; and when it is confirmed that the verification is passed, transmitting the acquired manufacturing process parameter information to the terminal device, so that the terminal device displays the acquired manufacturing process parameter information.

The reference ranges of the manufacturing process parameter information are registered in advance. A process of registering the reference ranges of the manufacturing process parameter information of the manufacturing equipments will be described below by way of example. For example, a type of a manufacturing process parameter of an manufacturing equipment EQP1 comprises a voltage. When a product A is manufactured, a reference range of voltage values of the manufacturing equipment EQP1 is [U1,U2]. A user may register an identification "EQP1" of the manufacturing equipment, a product type "A", the type "voltage" of the manufacturing process parameter and the reference range "[U1,U2]" of the voltage values as a set of associated information. Of course, other types of information may also be registered, for example, a reference range of temperature values when the manufacturing equipment EQP1 manufactures the product A; or a reference range of voltage values when an manufacturing equipment EQP2 manufactures the product A; or a reference range of rotation speed values when the manufacturing equipment EQP2 manufactures a product B. In the manufacturing process, there are many types of information similar to the above information, which may be registered according to practical requirements, and will not be described here in detail again. Multiple sets of information as above may be tabulated to form a reference range table.

When a certain type of product is processed using a certain manufacturing equipment, if it needs to verify whether a voltage value of the equipment is within a reference range at this time, manufacturing process parameter information of the manufacturing equipment is acquired, and the acquired process parameter information is verified according to information in the reference range table. The process of verifying the acquired manufacturing process parameter information will be described below by way of example. For example, if the manufacturing equipment is an manufacturing equipment EQP1 and the manufactured product is A, then the acquired manufacturing process parameter information comprises: an identification "EQP1" of the manufacturing equipment, a product type "A", a type "voltage" of the manufacturing process parameter, and a current voltage value, a reference range [U1,U2] of voltages is correspondingly acquired in the reference range table according to the set of information, to verify whether the current voltage value of the manufacturing equipment EQP1 exceeds the reference range [U1,U2], and when a verification result is no, it is confirmed the verification is passed, and when the verification result is yes, it is confirmed that the verification is failed.

The method for controlling a manufacturing process parameter according to the present disclosure further comprises: correspondingly storing the identification of the manufacturing equipment, the product type and the processing time of the processed product, and the type and the value of the manufacturing process parameter when the product is processed in the acquired manufacturing process parameter information; and when a query instruction for the manufacturing process parameter information is received, feeding back the stored identification of the manufacturing equipment, the stored product type and processing time of the processed product, and the stored type and value of the manufacturing process parameter when the product is processed for analysis.

In the embodiment of the present disclosure, when the reference ranges of the manufacturing process parameter information of the multiple manufacturing equipments are registered in advance, alarm mode information may also be registered, and there are alarm modes comprising equipment alarming and equipment freezing.

The manufacturing equipment EQP1 and the product A are still taken as an example. The user client may register the identification "EQP1" of the manufacturing equipment, the product type "A", the type "voltage" of the manufacturing process parameter, the reference range "[U1,U2]" of the voltage values, and "equipment alarming" as a set of associated information. In the process of manufacturing the product A by the manufacturing equipment EQP1, if the manufacturing execution server verifies that a voltage value of the manufacturing equipment EQP1 exceeds the reference range [U1,U2] at a certain time, the manufacturing execution server issues equipment alarm information for the manufacturing equipment EQP1 to the equipment interface server, and after receiving the equipment alarm information for the manufacturing equipment EQP1 which is issued by the manufacturing execution server, the equipment interface server converts the equipment alarm information into equipment alarm information which conforms to a first protocol and a first format, and issues the equipment alarm information which conforms to the first protocol and the first format to the manufacturing equipment, so that the manufacturing equipment gives an alarm. Correspondingly, if "equipment freezing" is used as registration information, when a voltage value of the manufacturing equipment EQP1 exceeds the reference range [U1,U2] at a certain time, the manufacturing equipment EQP1 stops operations.

Figure 5:
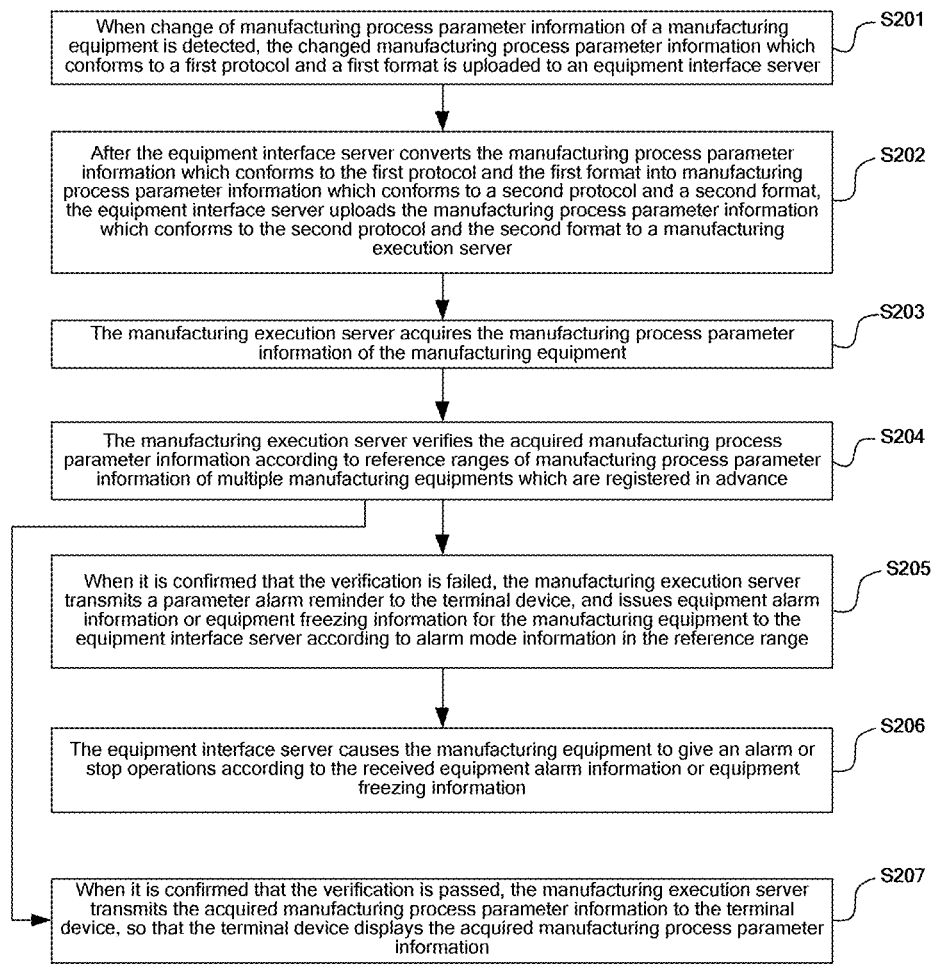
FIG. 5 is a schematic flowchart of an extended method for controlling a manufacturing process parameter according to an embodiment of the present disclosure.

FIG. 5 is a schematic flowchart of an extended method for controlling a manufacturing process parameter according to an embodiment of the present disclosure. The method comprises the following steps.

In S201, when change of manufacturing process parameter information of an manufacturing equipment is detected, the changed manufacturing process parameter information which conforms to a first protocol and a first format is uploaded to an equipment interface server.

The manufacturing process parameter information comprises an identification of the manufacturing equipment, a product type of a processed product, and a type and a value of the manufacturing process parameter when the product is processed.

The manufacturing process parameter information further comprises a processing time during which the product is processed by the manufacturing equipment.

When an equipment-side sensor detects the change of the manufacturing process parameter of the manufacturing equipment, the manufacturing equipment uploads information such as the identification of the manufacturing equipment, the product type of the processed product, the type and the value of the manufacturing process parameter when the product is processed, the processing time during which the product is processed by the manufacturing equipment etc. to a BC, and the BC uploads the above information to the equipment interface server in a form of Semiconductor Device Communication Standard (SECS) through a High Speed Message Services (HSMS) protocol.

In S202, after the equipment interface server converts the manufacturing process parameter information which conforms to the first protocol and the first format into manufacturing process parameter information which conforms to a second protocol and a second format, the equipment interface server uploads the manufacturing process parameter information which conforms to the second protocol and the second format to a manufacturing execution server.

In the embodiment of the present disclosure, the equipment interface server converts the message in the SECS format to encapsulate the message into a message in an eXtensible Markup Language (XML) format which may be identified by a TibcoRV middleware, and uploads the message in the XML format to the manufacturing execution server through the TibcoRV middleware.

In S203, the manufacturing execution server acquires the manufacturing process parameter information of the manufacturing equipment.

In the embodiment of the present disclosure, a message distribution circuit of the manufacturing execution server receives the message in the XML format which is transmitted by the equipment interface server, and then transfers the message to a transaction processing circuit.

In S204, the manufacturing execution server verifies the acquired manufacturing process parameter information according to reference ranges of manufacturing process parameter information of multiple manufacturing equipments which are registered in advance.

Specifically, in an implementation of the present disclosure, the transaction processing circuit acquires a reference range of the manufacturing process parameter and alarm mode information in a reference range table according to the identification of the manufacturing equipment, the product type of the processed product, and the type and the value of the manufacturing process parameter when the product is processed, to verify whether the acquired manufacturing process parameter is within the reference range; and determines a reference range of the manufacturing process parameter corresponding to the identification of the manufacturing equipment, the type of the manufacturing process parameter and the product type in the acquired manufacturing process parameter information according to a preset correspondence relationship between identifications of multiple manufacturing equipments, types of manufacturing process parameters and product types and reference ranges of the manufacturing process parameters.

Further, it is verified whether the value of the manufacturing process parameter in the acquired manufacturing process parameter information exceeds the reference range; and when a verification result is no, it is confirmed that the verification is passed; and when the verification result is yes, it is confirmed that the verification is failed.

In S205, when it is confirmed that the verification is failed, the manufacturing execution server transmits a parameter alarm reminder to the terminal device, and issues equipment alarm information or equipment freezing information for the manufacturing equipment to the equipment interface server according to alarm mode information in the reference range.

In the embodiment of the present disclosure, when it is confirmed that the verification is failed, it indicates that the manufacturing process parameter exceeds the reference range, the manufacturing execution server transmits the equipment alarm information or equipment freezing information to the equipment interface server according to a type of the alarm mode information, and the equipment interface server transmits the equipment alarm information or equipment freezing information to the manufacturing equipment through the equipment interface server and the BC; when the information received by the manufacturing equipment is the equipment alarm information, the manufacturing equipment analyzes content in the equipment alarm information, displays the content to a display screen of the manufacturing equipment synchronously and gives an alarm reminder sound to remind a user to adjust the manufacturing process parameter; and when the information received by the manufacturing equipment is the equipment freezing message, the manufacturing equipment stops operations to make manufacturing suspended, and waits for the user to troubleshoot the problem.

In the embodiment of the present disclosure, when it is confirmed that the verification is failed, the manufacturing execution server may further transmit the acquired manufacturing process parameter information to the terminal device, so that the terminal device displays the acquired manufacturing process parameter information.

In S206, the equipment interface server causes the manufacturing equipment to give an alarm or stop operations according to the received equipment alarm information or equipment freezing information.

In S207, when it is confirmed that the verification is passed, the manufacturing execution server transmits the acquired manufacturing process parameter information to the terminal device, so that the terminal device displays the acquired manufacturing process parameter information.

Figure 6:
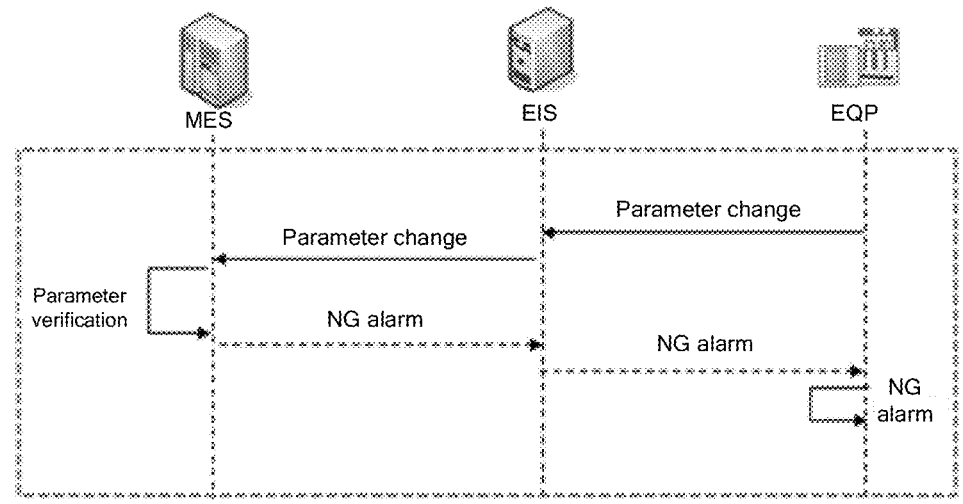
FIG. 6 is a schematic flowchart of a specific example of an extended method for controlling a manufacturing process parameter according to an embodiment of the present disclosure.

FIG. 6 is a schematic flowchart of a specific example of an extended method for controlling a manufacturing process parameter according to an embodiment of the present disclosure. As shown in FIG. 6, when the equipment interface server detects change of the manufacturing process parameter information of the manufacturing equipment, the manufacturing equipment uploads the changed manufacturing process parameter information which conforms to a first protocol and a first format to the equipment interface server; after the equipment interface server converts the manufacturing process parameter information which conforms to the first protocol and the first format into manufacturing process parameter information which conforms to a second protocol and a second format, the equipment interface server uploads the manufacturing process parameter information which conforms to the second protocol and the second format to the manufacturing execution server; after the manufacturing execution server acquires the manufacturing process parameter information of the manufacturing equipment, the manufacturing execution server verifies the acquired manufacturing process parameter information according to reference ranges of manufacturing process parameter information of multiple manufacturing equipments which are registered in advance; and when it is confirmed that the verification is failed, the manufacturing execution server transmits equipment alarm information to a terminal device, and the manufacturing equipment gives an alarm.

Figure 7:
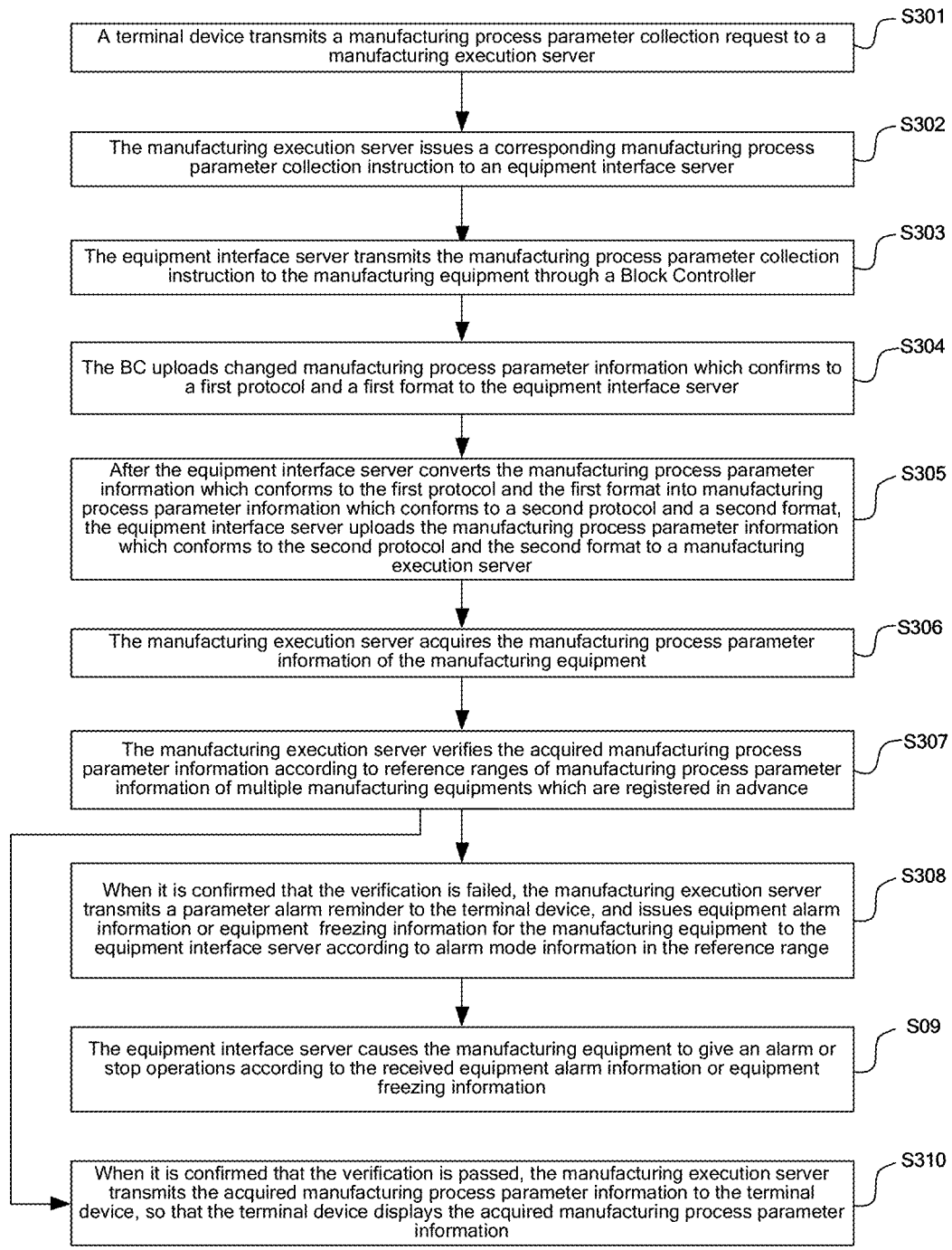
FIG. 7 is a schematic flowchart of an extended method for controlling a manufacturing process parameter according to an embodiment of the present disclosure.

FIG. 7 illustrates a schematic flowchart of an extended method for controlling a manufacturing process parameter according to an embodiment of the present disclosure. The method comprises the following steps.

In S301, a terminal device transmits a manufacturing process parameter collection request to a manufacturing execution server.

A user issues the manufacturing process parameter collection request to the manufacturing execution server through the terminal device.

The terminal device is configured as a user client.

In S302, the manufacturing execution server issues a corresponding manufacturing process parameter collection instruction to an equipment interface server.

When the manufacturing execution server receives the manufacturing process parameter collection request transmitted by the terminal device, the manufacturing execution server issues the corresponding manufacturing process parameter collection instruction to the equipment interface server.

In S303, the equipment interface server transmits the manufacturing process parameter collection instruction to the manufacturing equipment through a BC.

In S304, the BC uploads changed manufacturing process parameter information which confirms to a first protocol and a first format to the equipment interface server.

After the manufacturing equipment receives the manufacturing process parameter collection instruction, the manufacturing equipment uploads the manufacturing process parameter information such as the identification of the manufacturing equipment, the product type of the processed product, the type and the value of the manufacturing process parameter when the product is processed, the processing time during which the product is processed by the manufacturing equipment etc. to a BC, and the BC uploads the manufacturing process parameter information to the equipment interface server in a form of SECS through an HSMS protocol.

In S305, after the equipment interface server converts the manufacturing process parameter information which conforms to the first protocol and the first format into manufacturing process parameter information which conforms to a second protocol and a second format, the equipment interface server uploads the manufacturing process parameter information which conforms to the second protocol and the second format to a manufacturing execution server.

In the embodiment of the present disclosure, the equipment interface server converts the message in the SECS format to encapsulate the message into a message in an XML format which may be identified by a TibcoRV middleware, and uploads the message in the XML format to the manufacturing execution server through the TibcoRV middleware.

In S306, the manufacturing execution server acquires the manufacturing process parameter information of the manufacturing equipment.

Specifically, in the embodiment of the present disclosure, a message distribution circuit of the manufacturing execution server receives the message in the XML format which is transmitted by the equipment interface server, and then transfers the message to a transaction processing circuit.

In S307, the manufacturing execution server verifies the acquired manufacturing process parameter information according to reference ranges of manufacturing process parameter information of multiple manufacturing equipments which are registered in advance.

The specific method of this step is consistent with the specific method of S204 in the embodiment of the present disclosure described above, and will not be described here in detail again.

In S308, when it is confirmed that the verification is failed, the manufacturing execution server transmits a parameter alarm reminder to the terminal device, and issues equipment alarm information or equipment freezing information for the manufacturing equipment to the equipment interface server according to alarm mode information in the reference range.

The specific method of this step is consistent with the specific method of S205 in the embodiment of the present disclosure described above, and will not be described here in detail again.

In S309, the equipment interface server causes the manufacturing equipment to give an alarm or stop operations according to the received equipment alarm information or equipment freezing information.

In S310, when it is confirmed that the verification is passed, the manufacturing execution server transmits the acquired manufacturing process parameter information to the terminal device, so that the terminal device displays the acquired manufacturing process parameter information.

Figure 8:
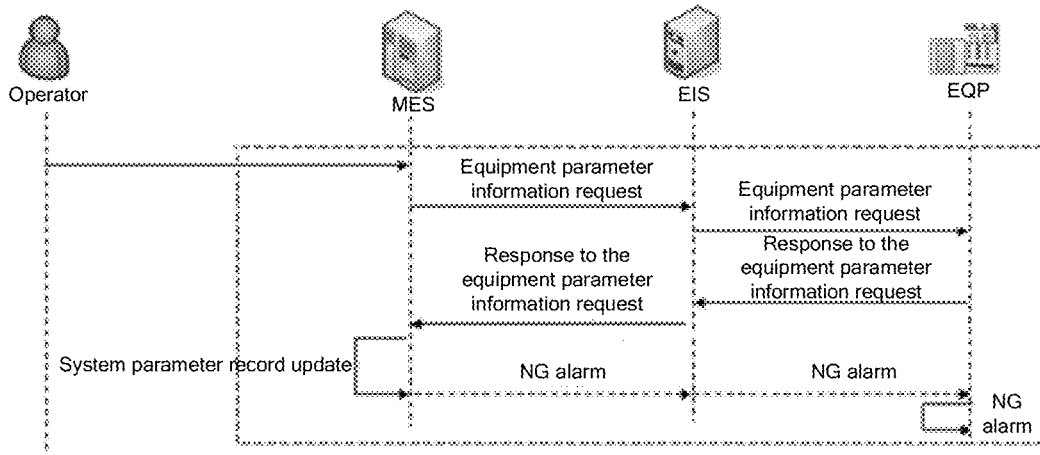
FIG. 8 is a schematic flowchart of a specific example of an extended method for controlling a manufacturing process parameter according to an embodiment of the present disclosure.

FIG. 8 is a schematic flowchart of a specific example of an extended method for controlling a manufacturing process parameter according to an embodiment of the present disclosure.

As shown in FIG. 8, a user issues a manufacturing process parameter collection request to a manufacturing execution server through a terminal device; the manufacturing execution server issues a corresponding manufacturing process parameter collection instruction to an equipment interface server; an equipment uploads changed manufacturing process parameter information which conforms to a first protocol and a first format to the equipment interface server; after the equipment interface server converts the manufacturing process parameter information which conforms to the first protocol and the first format into manufacturing process parameter information which conforms to a second protocol and a second format, the equipment interface server uploads the manufacturing process parameter information which conforms to the second protocol and the second format to the manufacturing execution server; the manufacturing execution server acquires the manufacturing process parameter information of the manufacturing equipment, and verifies the acquired manufacturing process parameter information according to reference ranges of manufacturing process parameter information of multiple manufacturing equipments which are registered in advance; when it is confirmed that the verification is failed, the manufacturing execution server issues equipment alarm information for the manufacturing equipment to the equipment interface server; and the equipment interface server causes the manufacturing equipment to give an alarm according to the received equipment alarm information.

Figure 9:
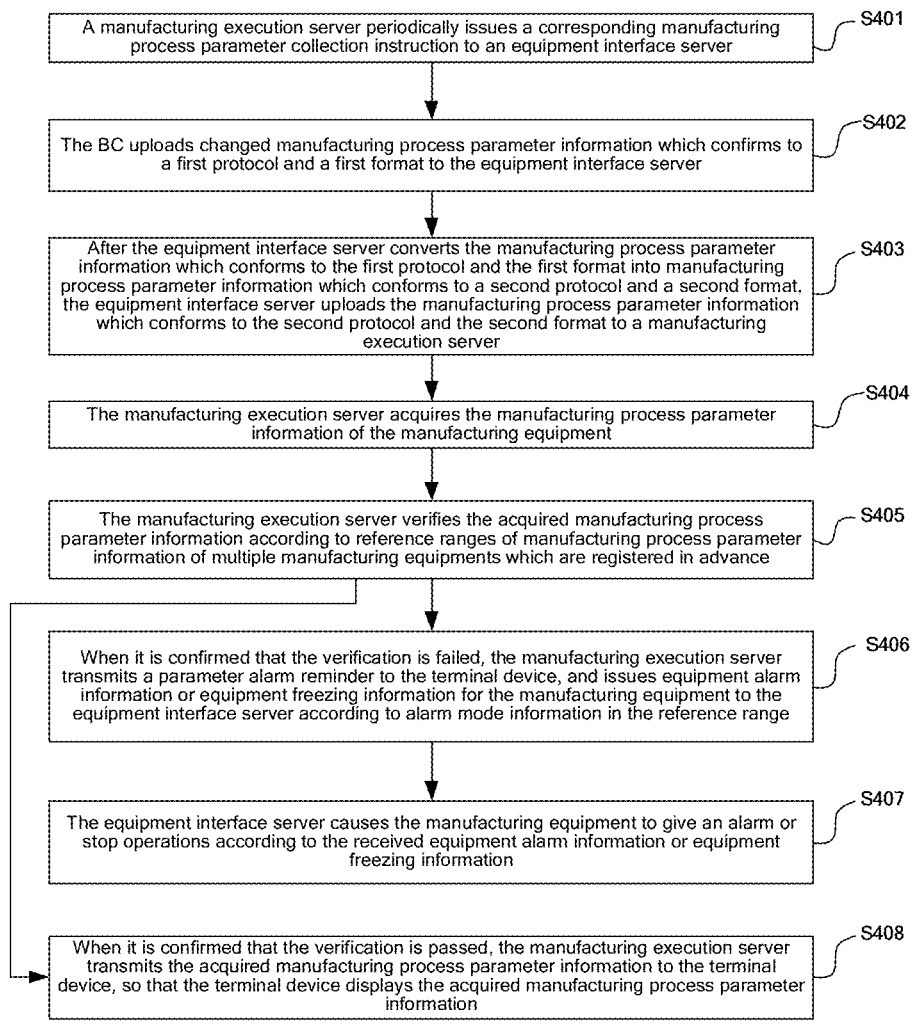
FIG. 9 is a schematic flowchart of an extended method for controlling a manufacturing process parameter according to an embodiment of the present disclosure.

FIG. 9 is a schematic flowchart of an extended method for controlling a manufacturing process parameter according to an embodiment of the present disclosure. The method comprises the following steps.

In S401, a manufacturing execution server periodically issues a corresponding manufacturing process parameter collection instruction to an equipment interface server.

The manufacturing execution server periodically issues the corresponding manufacturing process parameter collection instruction to the equipment interface server, and the equipment interface server transmits the manufacturing process parameter collection instruction to an manufacturing equipment through a BC.

In S402, the BC uploads changed manufacturing process parameter information which confirms to a first protocol and a first format to the equipment interface server.

After the manufacturing equipment receives the manufacturing process parameter collection instruction, the manufacturing equipment uploads the manufacturing process parameter information such as the identification of the manufacturing equipment, the product type of the processed product, the type and the value of the manufacturing process parameter when the product is processed, the processing time during which the product is processed by the manufacturing equipment etc. to a BC, and the BC uploads the changed manufacturing process parameter information which conforms to the first protocol and the first format to the equipment interface server, and specifically, the BC uploads the above manufacturing process parameter information to the equipment interface server in a form of SECS through an HSMS protocol.

In S403, after the equipment interface server converts the manufacturing process parameter information which conforms to the first protocol and the first format into manufacturing process parameter information which conforms to a second protocol and a second format, the equipment interface server uploads the manufacturing process parameter information which conforms to the second protocol and the second format to a manufacturing execution server.

In the embodiment of the present disclosure, the equipment interface server converts the message in the SECS format to encapsulate the message into a message in an XML format which may be identified by a TibcoRV middleware, and uploads the message in the XML format to the manufacturing execution server through the TibcoRV middleware.

In S404, the manufacturing execution server acquires the manufacturing process parameter information of the manufacturing equipment.

In the embodiment of the present disclosure, a message distribution circuit of the manufacturing execution server receives the message in the XML format which is transmitted by the equipment interface server, and then transfers the message to a transaction processing circuit.

In S405, the manufacturing execution server verifies the acquired manufacturing process parameter information according to reference ranges of manufacturing process parameter information of multiple manufacturing equipments which are registered in advance.

The specific method of this step is consistent with the specific method of S204 in the embodiment of the present disclosure described above, and will not be described here in detail again.

In S406, when it is confirmed that the verification is failed, the manufacturing execution server transmits a parameter alarm reminder to the terminal device, and issues equipment alarm information or equipment freezing information for the manufacturing equipment to the equipment interface server according to alarm mode information in the reference range.

The specific method of this step is consistent with the specific method of S205 in the embodiment of the present disclosure described above, and will not be described here in detail again.

In S407, the equipment interface server causes the manufacturing equipment to give an alarm or stop operations according to the received equipment alarm information or equipment freezing information.

In the embodiment of the present disclosure, when it is confirmed that the verification is failed, the manufacturing execution server may further transmit the acquired manufacturing process parameter information to the terminal device, so that the terminal device displays the acquired manufacturing process parameter information.

In S408, when it is confirmed that the verification is passed, the manufacturing execution server transmits the acquired manufacturing process parameter information to the terminal device, so that the terminal device displays the acquired manufacturing process parameter information.

Figure 10:
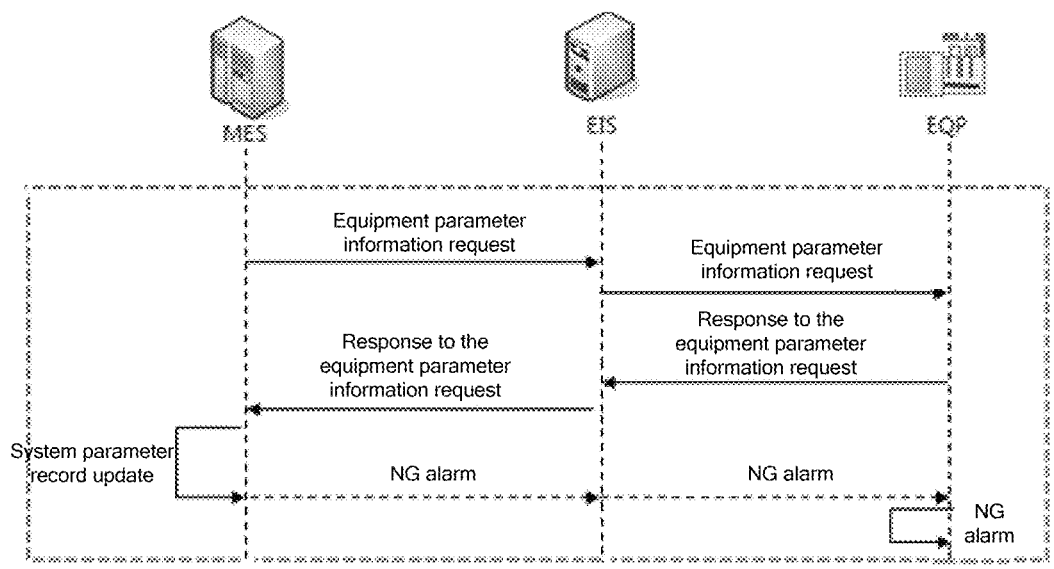
FIG. 10 is a schematic flowchart of a specific example of an extended method for controlling a manufacturing process parameter according to an embodiment of the present disclosure.

FIG. 10 is a schematic flowchart of a specific example of an extended method for controlling a manufacturing process parameter according to an embodiment of the present disclosure. As shown in FIG. 10, a manufacturing execution server periodically issues a corresponding manufacturing process parameter collection instruction to an equipment interface server, and an equipment uploads changed manufacturing process parameter information which conforms to a first protocol and a first format to the equipment interface server; after the equipment interface server converts the manufacturing process parameter information which conforms to the first protocol and the first format into manufacturing process parameter information which conforms to a second protocol and a second format, the equipment interface server transmits the manufacturing process parameter information which conforms to the second protocol and the second format to the manufacturing execution server; the manufacturing execution server acquires the manufacturing process parameter information of the manufacturing equipment, and verifies the acquired manufacturing process parameter information according to reference ranges of manufacturing process parameter information of multiple manufacturing equipments which are registered in advance; when it is confirmed that the verification is failed, the manufacturing execution server issues equipment alarm information for the manufacturing equipment to the equipment interface server; and the equipment interface server causes the manufacturing equipment to give an alarm according to the received equipment alarm information.

Figure 11:
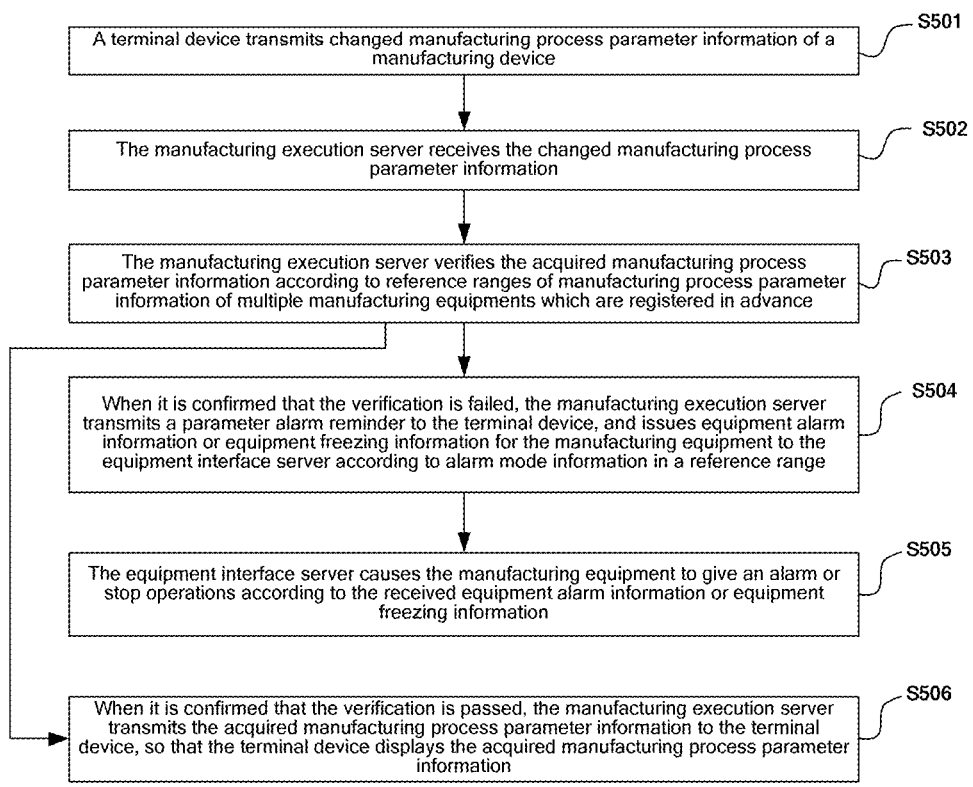
FIG. 11 is a schematic flowchart of an extended method for controlling a manufacturing process parameter according to an embodiment of the present disclosure.

FIG. 11 illustrates a schematic flowchart of a fourth extended method for controlling a manufacturing process parameter according to an embodiment of the present disclosure. The method comprises the following steps.

In S501, a terminal device transmits changed manufacturing process parameter information of an manufacturing equipment.

A user edits the changed manufacturing process parameter information of the manufacturing equipment in a terminal device, and then the user uses the terminal device to transmit the changed manufacturing process parameter information of the manufacturing equipment to a manufacturing execution server. In an embodiment, the terminal device is configured as a Personal Digital Assistant (PDA).

The user uses the terminal device to upload the changed manufacturing process parameter information of the manufacturing equipment to the manufacturing execution server in an xml format through a company's internal Transmission Control Protocol (TCP) protocol network middleware using Web Service technology.

In S502, the manufacturing execution server receives the changed manufacturing process parameter information.

Specifically, in an implementation of the present disclosure, a message distribution circuit of the manufacturing execution server receives the message in the XML format which is transmitted by the terminal device, and then transfers the message to a transaction processing circuit.

In S503, the manufacturing execution server verifies the acquired manufacturing process parameter information according to reference ranges of manufacturing process parameter information of multiple manufacturing equipments which are registered in advance.

The specific method of this step is consistent with the specific method of S204 in the embodiment of the present disclosure described above, and will not be described here in detail again.

In S504, when it is confirmed that the verification is failed, the manufacturing execution server transmits a parameter alarm reminder to the terminal device, and issues equipment alarm information or equipment freezing information for the manufacturing equipment to the equipment interface server according to alarm mode information in a reference range.

The specific method of this step is consistent with the specific method of S205 in the embodiment of the present disclosure described above, and will not be described here in detail again.

In S505, the equipment interface server causes the manufacturing equipment to give an alarm or stop operations according to the received equipment alarm information or equipment freezing information.

In S506, when it is confirmed that the verification is passed, the manufacturing execution server transmits the acquired manufacturing process parameter information to the terminal device, so that the terminal device displays the acquired manufacturing process parameter information.

The extended method for controlling a manufacturing process parameter according to the above embodiment of the present disclosure further comprises: correspondingly storing an identification of the manufacturing equipment, a product type and a processing time of a processed product, and a type and a value of the manufacturing process parameter when the product is processed in the acquired manufacturing process parameter information; and when a query instruction for the manufacturing process parameter information is received, feeding back the stored identification of the manufacturing equipment, the stored product type and processing time of the processed product, and the stored type and value of the manufacturing process parameter when the product is processed for analysis.

Figure 12:
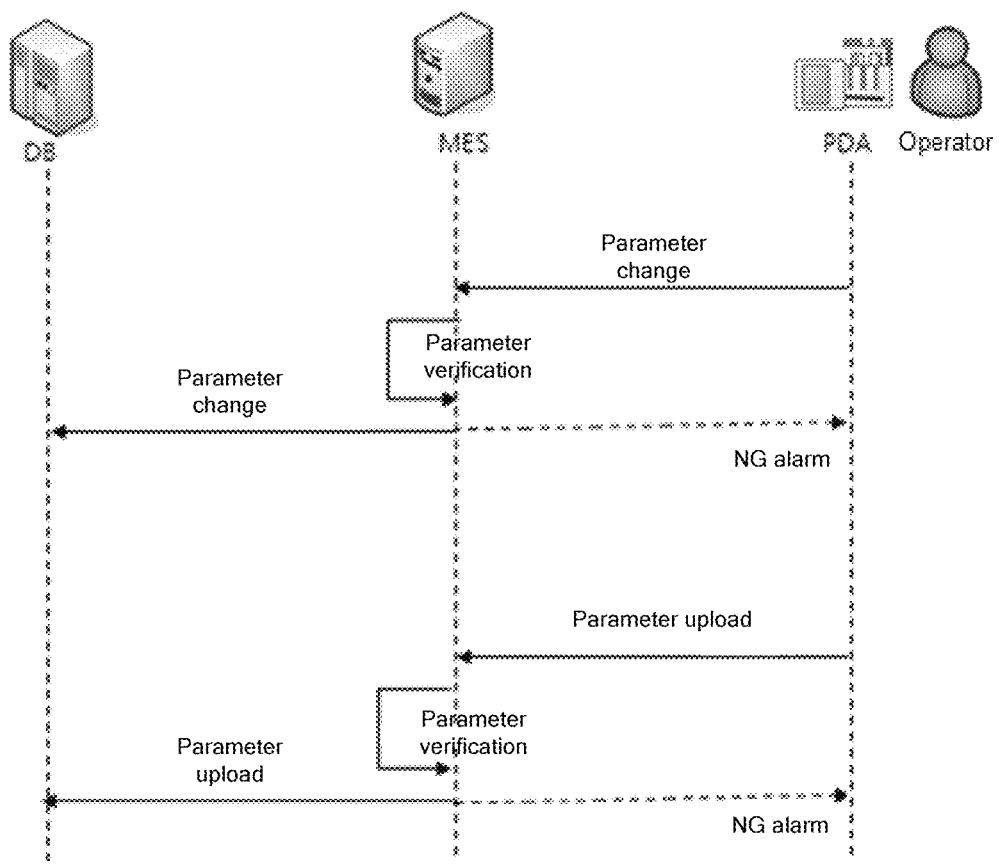
FIG. 12 is a schematic flowchart of a specific example of an extended method for controlling a manufacturing process parameter according to an embodiment of the present disclosure.

FIG. 12 is a schematic flowchart of a specific example of an extended method for controlling a manufacturing process parameter according to an embodiment of the present disclosure. As shown in FIG. 12, a user uses a PDA to transmit changed manufacturing process parameter information of an manufacturing equipment to a manufacturing execution server; the manufacturing execution server receives the changed manufacturing process parameter information, and verifies the acquired manufacturing process parameter information according to reference ranges of manufacturing process parameter information of multiple manufacturing equipments which are registered in advance; when it is confirmed that the verification is failed, the manufacturing execution server issues equipment alarm information for the manufacturing equipment to an equipment interface server; and the equipment interface server causes the manufacturing equipment to give an alarm according to the received equipment alarm information. At the same time, after the manufacturing execution server receives the changed manufacturing process parameter information, the manufacturing execution server stores the manufacturing process parameter information in a database.

The database correspondingly stores an identification of the manufacturing equipment, a product type and a processing time of a processed product, and a type and a value of the manufacturing process parameter when the product is processed in the acquired manufacturing process parameter information.

Manufacturing process parameters corresponding to all products are enabled to be traceable, which may help users to acquire specific data and abnormal conditions of the manufacturing process parameters of the manufacturing equipment at a certain time. For example, in a process of manufacturing a type A of products, a fault product A1 appears. A fault analysis device may feed back manufacturing process parameters of relevant manufacturing equipments in the entire process of manufacturing the fault product A1, and manufacturing process parameters of relevant manufacturing equipments in the entire process of manufacturing a qualified product A2. The user may compare the respective manufacturing process parameters involved in the fault product A1 with the respective manufacturing process parameters involved in the qualified product A2 to determine differences therebetween, and use the differences as a breakthrough to dig deeper into process defects which result in the fault, and at the same time feed back a digging result to a manufacturing process parameter reference setting device, to optimize reference ranges of the manufacturing process parameters, improve the ability to dig deep into the fault, and improve the yield of products.

Figure 13:
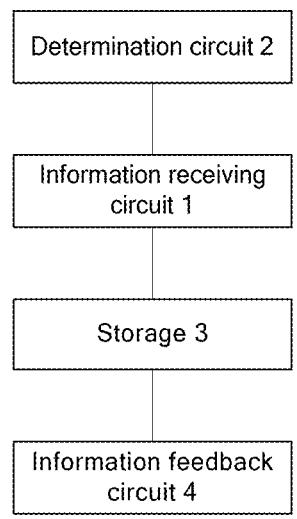
FIG. 13 is a schematic block diagram of a manufacturing execution server according to an embodiment of the present disclosure.

Based on the same concept of the present disclosure, the embodiments of the present disclosure further provide a manufacturing execution server. A schematic block diagram of an internal structure of the manufacturing execution server is shown in FIG. 13, and comprises:

an information receiving circuit 1 configured to acquire manufacturing process parameter information of an manufacturing equipment; and a determination circuit 2 configured to verify the acquired manufacturing process parameter information according to reference ranges of manufacturing process parameter information of multiple manufacturing equipments which are registered in advance, and feed back a verification result.

The manufacturing execution server according to the embodiment of the present disclosure further comprises:

a storage 3 configured to store the identification of the manufacturing equipment, the product type and the processing time of the processed product, and the type and the value of the manufacturing process parameter when the product is processed in the acquired manufacturing process parameter information, or store the identification of the manufacturing equipment, the product type and the processing time of the processed product, and the type and the value of the manufacturing process parameter when the product is processed in the acquired manufacturing process parameter information in a database outside the manufacturing execution server; and an information feedback circuit 4 configured to, when a query instruction for the manufacturing process parameter information is received from a fault analysis device outside the manufacturing execution server, feed back the stored identification of the manufacturing equipment, the stored product type and processing time of the processed product, and the stored type and value of the manufacturing process parameter when the product is processed for analysis.

Figure 14:
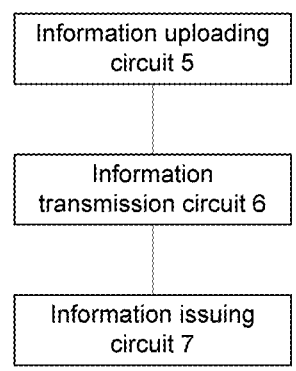
FIG. 14 is a schematic block diagram of an equipment interface server according to an embodiment of the present disclosure.

Based on the same concept of the present disclosure, the embodiments of the present disclosure further provide an equipment interface server. A schematic block diagram of an internal structure of the equipment interface server is shown in FIG. 14, and comprises:

an information uploading circuit 5 configured to detect change of manufacturing process parameter information of an manufacturing equipment, or receive a manufacturing process parameter collection instruction issued by a manufacturing execution server and acquire manufacturing process parameter information of the manufacturing equipment which conforms to a first protocol and a first format; and an information transmission circuit 6 configured to, after the manufacturing process parameter information which conforms to the first protocol and the first format is converted into manufacturing process parameter information which conforms to a second protocol and a second format, upload the manufacturing process parameter information which conforms to the second protocol and the second format to the manufacturing execution server, so that the manufacturing execution server verifies the acquired manufacturing process parameter information according to reference ranges of manufacturing process parameter information of multiple manufacturing equipments which are registered in advance, and feed back a verification result.

The equipment interface server according to the embodiment of the present disclosure further comprises:

an information issuing circuit 7 configured to, when equipment alarm information or equipment freezing information for the manufacturing equipment issued by the manufacturing execution server is received, convert the equipment alarm information or equipment freezing information into equipment alarm information or equipment freezing information which conforms to the first protocol and the first format, and issue the equipment alarm information or equipment freezing information which conforms to the first protocol and the first format to the manufacturing equipment, so that the manufacturing equipment gives an alarm or stops operations.

Figure 15:
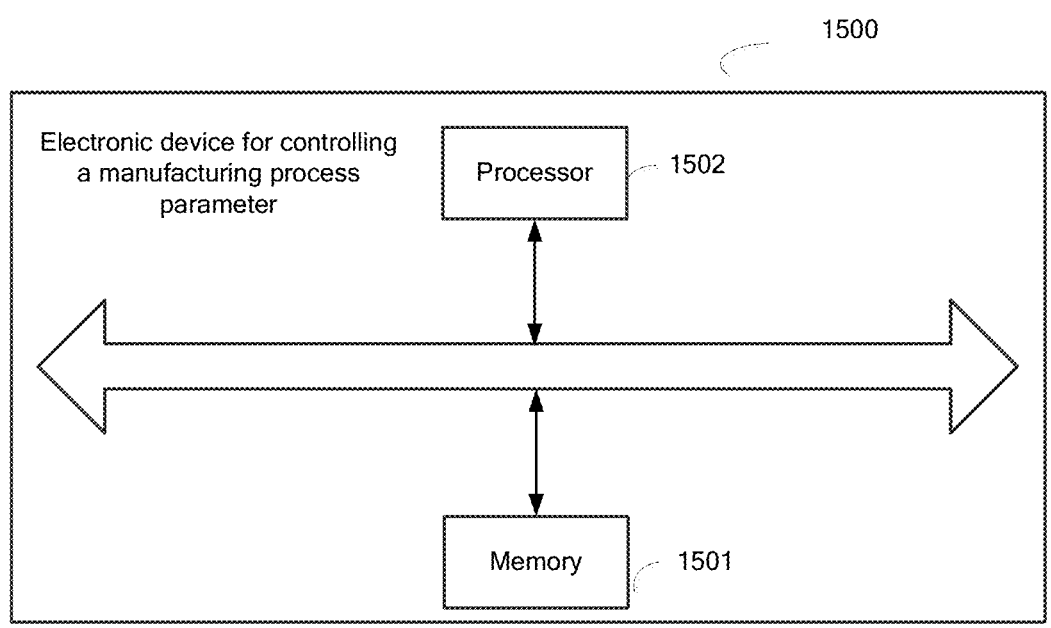
FIG. 15 is a structural diagram of an electronic device for controlling a manufacturing process parameter according to an embodiment of the present disclosure.

FIG. 15 is a structural diagram of an electronic device for controlling a manufacturing process parameter according to an embodiment of the present disclosure. As shown in FIG. 15, the electronic device 1500 for controlling a manufacturing process parameter comprises:

a memory 1501 having stored thereon executable instructions; and a processor 1502 electrically connected to the memory 1501, wherein the processor implements steps of the method for controlling a manufacturing process parameter according to any of the embodiments of the present disclosure by executing the executable instructions.

Based on the same concept of the present disclosure, the embodiments of the present disclosure further provide a computer-readable storage medium having stored thereon a computer program which, when executed, implements steps of the method for controlling a manufacturing process parameter according to the present disclosure and the embodiments of the present disclosure described above.

Based on the same concept of the present disclosure, the embodiments of the present disclosure further provide another computer-readable storage medium having stored thereon a computer program which, when executed, implements steps of the method for controlling a manufacturing process parameter according to the present disclosure and the embodiments of the present disclosure described above.

In the embodiment of the present disclosure, interaction of information between a system for controlling a manufacturing process parameter and an manufacturing equipment may be realized in real time, i.e., having high timeliness. The manufacturing process parameter information of the manufacturing equipment may be automatically collected and verified, and at the same time a verification result is fed back, the manufacturing process parameter is collected at a higher speed, the verification has higher accuracy, and the verification result may be fed back rapidly, to avoid a batch of quality accidents.

In the embodiment of the present disclosure, when it is confirmed that the verification of the manufacturing process parameter of the manufacturing equipment is failed, a manufacturing execution server may issue equipment alarm information for the manufacturing equipment to an equipment interface server to remind a user to adjust the manufacturing process parameter in time; or the manufacturing execution server may issue equipment freezing information for the manufacturing equipment to an equipment interface, so that the manufacturing equipment stops operations to make the manufacturing suspended, thereby avoiding continuous manufacturing of fault products, and ensuring the safety of the manufacturing equipment; and the manufacturing execution server may further transmit a parameter alarm reminder to a terminal device, so that even if the user is not in a manufacturing site, the user may obtain a verification result in time through the user client to immediately take corresponding measures.

In the embodiment of the present disclosure, the identification of the manufacturing equipment, the product type and processing time of the processed product, and the type and value of the manufacturing process parameter when the product is processed may be correspondingly stored in a database, to enable manufacturing process parameters corresponding to all products to be traceable, which may help users to acquire specific data and abnormal conditions of the manufacturing process parameters of the manufacturing equipment at a certain time; and when a fault product appears, respective manufacturing process parameters involved in the fault product may be compared with respective manufacturing process parameters involved in a qualified product to determine differences therebetween, and the differences are used as a breakthrough to dig deeper into process defects which result in the fault, and at the same time a digging result is fed back to a manufacturing process parameter reference setting device, to optimize reference ranges of the manufacturing process parameters, improve the ability to dig deep into the fault, and improve the yield of products.

In the embodiment of the present disclosure, the user may be enabled to record and upload the manufacturing process parameter of the manufacturing equipment through a PDA, and the uploaded manufacturing process parameter may be directly stored in a database, which facilitates the management of a large number of manufacturing process parameters, while reducing the user's workload.

It may be understood by those skilled in the art that steps, measures, and solutions in various operations, methods, and flows which have been discussed in the present disclosure may be alternated, changed, combined, or deleted. Further, other steps, measures, and solutions in various operations, methods, and flows which have been discussed in the present disclosure may also be alternated, changed, rearranged, decomposed, combined, or deleted. Further, steps, measures, and solutions in the related art in various operations, methods, and flows disclosed in the present disclosure may also be alternated, changed, rearranged, decomposed, combined, or deleted.

The above description is only a part of the embodiments of the present disclosure. It should be illustrated that for those of ordinary skill in the art, several improvements and retouches may further be made without departing from the principles of the present disclosure. These improvements and retouches should also be regarded as being within the protection scope of the present disclosure.

We claim:

1. A method for controlling a manufacturing process parameter, comprising:

acquiring, by a manufacturing execution server, manufacturing process parameter information of a manufacturing equipment, wherein the manufacturing process parameter information is a signal detected from an equipment sensor when a change occurs in the manufacturing equipment; and verifying, by the manufacturing execution server, the acquired manufacturing process parameter information according to reference ranges of manufacturing process parameter information of multiple manufacturing equipments which are registered in advance, and feeding back a verification result, wherein the manufacturing process parameter information comprises an identification of the manufacturing equipment, a product type of a processed product, and a type and a value of the manufacturing process parameter when the product is processed; and the manufacturing process parameter information further comprises a processing time during which the product is processed by the manufacturing equipment, and wherein verifying the acquired manufacturing process parameter information according to the reference ranges of the manufacturing process parameter information of the multiple manufacturing equipments which are registered in advance comprises:

determining a reference range of the manufacturing process parameter corresponding to the identification of the manufacturing equipment, the type of the manufacturing process parameter and the product type in the acquired manufacturing process parameter information according to a preset correspondence relationship between identifications of multiple manufacturing equipments, types of manufacturing process parameters and product types and reference ranges of the manufacturing process parameters; and verifying whether the value of the manufacturing process parameter in the acquired manufacturing process parameter information exceeds the reference range, and when the verification result is no, confirming that the verification is passed; and when the verification result is yes, confirming that the verification is failed.

2. The method according to claim 1, wherein acquiring manufacturing process parameter information of a manufacturing equipment comprises at least one of:

receiving changed manufacturing process parameter information of the manufacturing equipment which is uploaded by an equipment interface server; or when a manufacturing process parameter collection request transmitted by a terminal device is received, issuing a corresponding manufacturing process parameter collection instruction to receive manufacturing process parameter information of the manufacturing equipment which is uploaded by the equipment interface server for the instruction; or receiving manufacturing process parameter information of the manufacturing equipment which is uploaded by the equipment interface server for a manufacturing process parameter collection instruction which is issued periodically; or receiving changed manufacturing process parameter information of the manufacturing equipment which is transmitted by the terminal device.

3. The method according to claim 1, wherein feeding back a verification result comprises:

when it is confirmed that the verification is failed, transmitting a parameter alarm reminder to the terminal device, and issuing equipment alarm information or equipment freezing information for the manufacturing equipment to the equipment interface server according to alarm mode information in the reference range, so that the manufacturing equipment gives an alarm or stops operations; and when it is confirmed that the verification is passed, transmitting the acquired manufacturing process parameter information to the terminal device, so that the terminal device displays the acquired manufacturing process parameter information.

4. The method according to claim 1, further comprising: storing the identification of the manufacturing equipment, the product type and the processing time of the processed product, and the type and the value of the manufacturing process parameter when the product is processed in the acquired manufacturing process parameter information; and when a query instruction for the manufacturing process parameter information is received, feeding back the stored identification of the manufacturing equipment, the stored product type and processing time of the processed product, and the stored type and value of the manufacturing process parameter when the product is processed for analysis.

5. A non-transitory computer-readable storage medium having stored thereon a computer program which, when executed by a processor, implements the method for controlling a manufacturing process parameter according to claim 1.

6. A method for controlling a manufacturing process parameter, comprising:

receiving changed manufacturing process parameter information of a manufacturing equipment which conforms to a first protocol and a first format, or when a manufacturing process parameter collection instruction issued by a manufacturing execution server is received, acquiring manufacturing process parameter information of the manufacturing equipment which conforms to the first protocol and the first format; and after the manufacturing process parameter information which conforms to the first protocol and the first format is converted into manufacturing process parameter information which conforms to a second protocol and a second format, uploading the manufacturing process parameter information which conforms to the second protocol and the second format to the manufacturing execution server, so that the manufacturing execution server verifies the uploaded manufacturing process parameter information according to reference ranges of manufacturing process parameter information of multiple manufacturing equipments which are registered in advance, and feeding back a verification result, wherein the manufacturing process parameter information received or acquired is a signal detected from an equipment sensor when a change occurs in the manufacturing equipment.

7. The method according to claim 6, further comprising:

when equipment alarm information or equipment freezing information for the manufacturing equipment issued by the manufacturing execution server is received, converting the equipment alarm information or equipment freezing information into equipment alarm information or equipment freezing information which conforms to the first protocol and the first format, and issuing the equipment alarm information or equipment freezing information which conforms to the first protocol and the first format to the manufacturing equipment, so that the manufacturing equipment gives an alarm or stops operations.

8. A non-transitory computer-readable storage medium having stored thereon a computer program which, when executed by a processor, implements the method for controlling a manufacturing process parameter according to claim 6.

9. An electronic device for controlling a manufacturing process parameter, comprising:

a processor; and a memory connected to the processor, and having stored thereon executable instructions which, when executed by the processor, cause the processor to be configured to:

acquire, by a manufacturing execution server, manufacturing process parameter information of a manufacturing equipment, wherein the manufacturing process parameter information is a signal detected from an equipment sensor when a change occurs in the manufacturing equipment; and verify, by the manufacturing execution server, the acquired manufacturing process parameter information according to reference ranges of manufacturing process parameter information of multiple manufacturing equipments which are registered in advance, and feed back a verification result, wherein the manufacturing process parameter information comprises an identification of the manufacturing equipment, a product type of a processed product, and a type and a value of the manufacturing process parameter when the product is processed; and the manufacturing process parameter information further comprises a processing time during which the product is processed by the manufacturing equipment, and wherein the processor is further configured to:

determine a reference range of the manufacturing process parameter corresponding to the identification of the manufacturing equipment, the type of the manufacturing process parameter and the product type in the acquired manufacturing process parameter information according to a preset correspondence relationship between identifications of multiple manufacturing equipments, types of manufacturing process parameters and product types and reference ranges of the manufacturing process parameters; and verify whether the value of the manufacturing process parameter in the acquired manufacturing process parameter information exceeds the reference range, and when the verification result is no, confirm that the verification is passed; and when the verification result is yes, confirm that the verification is failed.

10. The electronic device according to claim 9, wherein the processor is further configured to perform at least one of:

receiving changed manufacturing process parameter information of the manufacturing equipment which is uploaded by an equipment interface server; or when a manufacturing process parameter collection request transmitted by a terminal device is received, issuing a corresponding manufacturing process parameter collection instruction to receive manufacturing process parameter information of the manufacturing equipment which is uploaded by the equipment interface server for the instruction; or receiving manufacturing process parameter information of the manufacturing equipment which is uploaded by the equipment interface server for a manufacturing process parameter collection instruction which is issued periodically; or receiving changed manufacturing process parameter information of the manufacturing equipment which is transmitted by the terminal device.

11. The electronic device according to claim 9, wherein the processor is further configured to:

when it is confirmed that the verification is failed, transmit a parameter alarm reminder to the terminal device, and issue equipment alarm information or equipment freezing information for the manufacturing equipment to the equipment interface server according to alarm mode information in the reference range, so that the manufacturing equipment gives an alarm or stops operations; and when it is confirmed that the verification is passed, transmit the acquired manufacturing process parameter information to the terminal device, so that the terminal device displays the acquired manufacturing process parameter information.

12. The electronic device according to claim 9, further comprising:

a storage configured to store the identification of the manufacturing equipment, the product type and the processing time of the processed product, and the type and the value of the manufacturing process parameter when the product is processed in the acquired manufacturing process parameter information, wherein the processor is further configured to, when a query instruction for the manufacturing process parameter information is received, feed back the stored identification of the manufacturing equipment, the stored product type and processing time of the processed product, and the stored type and value of the manufacturing process parameter when the product is processed for analysis.

* * * * *